March 22, 1960 — R. G. STARCK ET AL — 2,929,105
EJECTION APPARATUS FOR MOLDING MACHINES
Filed April 3, 1957 — 2 Sheets-Sheet 1

INVENTORS
GEORGE B. SPRANSY AND
RICHARD G. STARCK
BY Carl J. Barbee
ATTORNEY

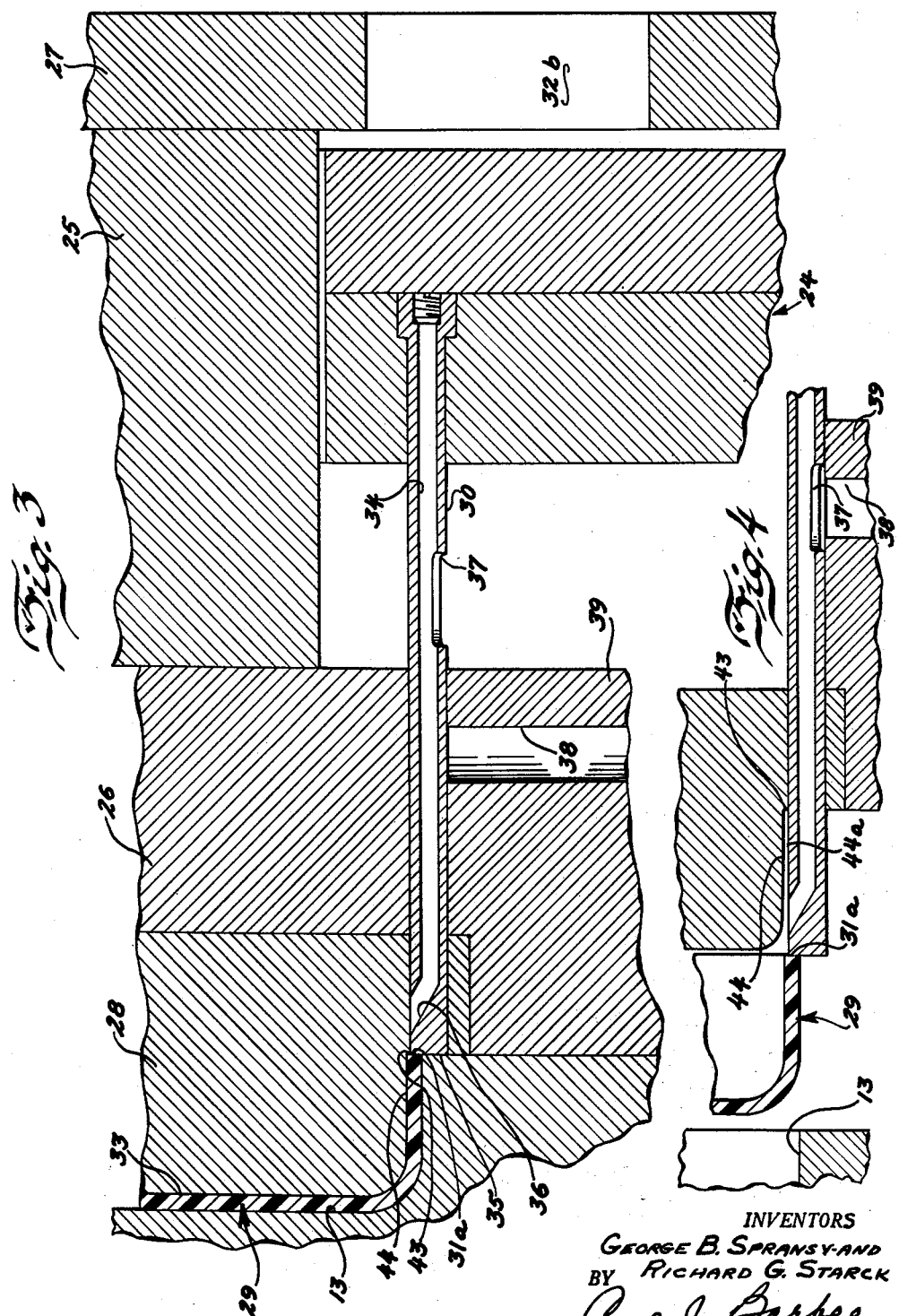

United States Patent Office 2,929,105
Patented Mar. 22, 1960

2,929,105

EJECTION APPARATUS FOR MOLDING MACHINES

Richard G. Starck and George B. Spransy, Milwaukee, Wis., assignors to American Motors Corporation, Kenosha, Wis., a corporation of Maryland Application April 3, 1957, Serial No. 650,363

1 Claim. (Cl. 18—42)

The invention relates to the art of molding and has particular reference to the problem of ejection of the end product from the dies of the molding apparatus.

The principal object of the invention is to provide means for supplementing the conventional ejection apparatus of a molding machine to assure unerring ejection of the end product at the completion of the molding cycle.

A further object is to provide such ejection apparatus which will permit fully automatic operation of the molding machine throughout the complete molding cycle thereby resulting in uniform end product quality.

A specific object is to provide an air passage in one or more of the ejector pins for directing a charge of air onto the end product during ejection thereof.

Other objects and advantages of the invention will be apparent from the ensuing specification and two sheets of drawings in which:

Fig. 3 is an enlarged fragmentary sectional view of a portion of the apparatus of Fig. 2.

Fig. 4 is a fragmentary sectional view similar to Fig. 3 but with the dies in open position and ejection of the end product being effected.

Figure 1:
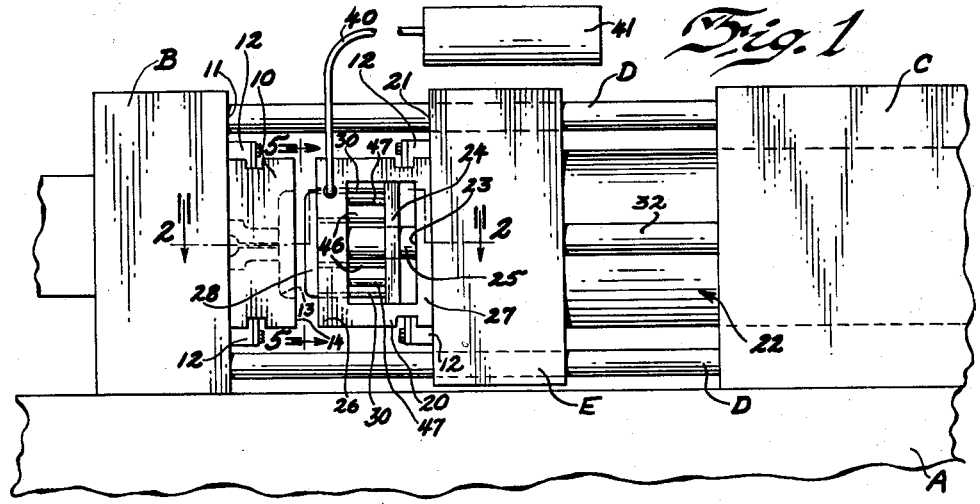
Fig. 1 is a generally schematic side elevational view of a conventional injection type molding machine employing the invention.

The type of molding machine as shown in Fig. 1 is generally a conventional injection type molding machine including a stationary base A to which is secured the stationary upright B and the clamping cylinder housing C. Parallel support rods D (of which there are usually 4) extend between the upright B and the cylinder housing and support the movable carrier E.

A stationary die block 10 is removably secured to the end face 11 of the upright B as by means of adjustable clamps 12 (there usually being several of such clamps). In the illustration as shown in Fig. 1, the die block 10 serves as the female die having the cavity 13 formed in the end face 14 thereof. A sprue bushing 15 is inserted in the die block and the locating ring 16 serves to position the die block relative to the upright B. The material (such as a synthetic resin) to be cast is introduced into the mold cavity through the sprue opening 17 while in a fluid state and under pressure, a suitable feeding apparatus (not shown) extending through the upright B into association with the sprue bushing.

The die block 20 is removably anchored to the end face 21 of the carrier E as by means of the removable clamps 12. Thus the die block 20 and the carrier are movable toward and away from die block 10 preferably under the influence of a suitable source of hydraulic pressure introduced into the cylinder housing C and acting on the ram 22. The carrier E is, of course, secured to one end of the ram.

Positioned and guided within the confines of an open area 23 in the movable die block is an ejector plate 24 which has suitable openings therethrough through which various support pillars 25 pass. These pillars are secured at their opposite ends within the forward portion 26 and the rearward portion 27 of the die block and lend needed rigidity thereto. While we have shown the movable die block as being integrally constructed in Figs. 1 and 2, such blocks are normally made up of separate plates (as shown in Figs. 3 and 4) anchored together to form in effect a unitary die block. The forward end of the die block has the core portion 28 of the die formed thereon and when the male and female die members are in closed position, as shown in Fig. 3, the cavity defining the configuration of the end product 29 is formed. For purposes of illustration, a simple type of end product configuration has been shown.

When the dies have been brought into closed position as shown in Fig. 3, the ends of the ejector pins 30 are flush with the end face 31 (the parting line) of the male die forming part of the die wall defining the end face 31a of the end product, so that when the molding operation is completed and solidification of the casting 29 has taken place, then the carrier E is withdrawn (bringing the ejection apparatus into action) and the core is retracted from the cavity in the female die sufficiently far to permit the casting to be freed for removal (as best indicated in Fig. 4). The casting, due to a shrinkage factor previously taken into consideration, always clings to the core 28. (It will be understood that there may be situations where, after taking into consideration the shrinkage factor of a particular casting, the casting may cling to the die which would be referred to as the female die, however, this is simply a matter of terminology and the dies can be so fabricated that the casting will always cling to the movable die 20 as desired.)

After the carrier is retracted a sufficient distance to permit the casting to be freed, then the ejector plate engages suitable adjustable stops 32 which are secured to the cylinder housing C and which project through suitable openings 32a and 32b in the carrier and die block 20 respectively. Continued retraction of the carrier causes forward movement of the ejector plate 24 relative to the die 20 thereby causing the ejector pins to push the casting away from the core 28. When the ejector pins have pushed the casting clear of the end face 33 of the core, the casting would normally drop down toward the base A of the machine, however, there are times when the casting may become "hung up" on one of the ejector pins (the casting would normally tend to drop toward the machine base in a direct vertical path).

Supplementing the ejector pins 30 and 46 (the end faces of which form part of the die cavity) are return pins 47 which are located outside of the boundaries of the die cavity and which bear against the end wall 14 of the stationary die block during the period when the ejector pins are pushing the casting off of the core.

All of the foregoing description of the molding apparatus together with the casting ejection apparatus is conventional but its disclosure is essential to a full understanding of the following described novel apparatus.

In order to assure that the casting is positively freed, we have provided apparatus supplementary to the ejector pins and assuring automatic removal of the casting from the dies.

Referring to Fig. 3, one of the ejector pins 30 is shown in detail on an enlarged scale (which in the particular instance is actual size). The ejector pin has a passage 34 extending axially therethrough to a point near the forward end 35 thereof. This primary passage intersects with the branch passage 36 which opens out through the side wall of the pin just short of the end thereof. An inlet opening 37 in the wall of the pin is situated a predetermined distance from the feed passage 38 in the die wall 39. Suitable tubing 40 may be inserted in the ends of the feed passages and lead to a common source of pressurized air, such as a compressor 41.

During retraction of the carrier B and after the ejector plate 24 engages the stops 32, the ejector pins commence pushing the casting away from the core 28 until finally the opening 37 comes into registry with the passage 38 (which at the moment is pressurized). A charge of air is directed through passage 34 and passage 36 onto the end product thereby positively freeing the end product from the male die so that same may drop down toward the machine base into a suitable receptacle (not shown). By opening passage 36 through the side wall of the ejector pin, when the open end of said passage goes beyond the shoulder 43, a clearance space 44a is created along side of the outer wall 44 of the die (as best viewed in Fig. 4) for permitting the air blast to be directed into the interior of the casting as desired to insure an adequate thrust being exerted thereagainst.

The clearance between the die wall 44 and the various ejector pins also assures that the die wall will not be scuffed as the pins pass alongside thereof during ejection.

Referring to Fig. 1, it will be noted that the ejector pins which are provided with the air passages are located above the center line of the die, preferably near the upper end thereof, and the air thrust is thus exerted onto the upper end of the casting tending to cause same to swing outwardly from the core before dropping toward the machine base. This assures that there is no likelihood of the casting becoming caught on one of the lower ejector pins 46 while dropping to the machine base.

The length of and the positioning of opening 37 in conjunction with the inside diameter of the passage 38 assures that air pressure will continue to be fed to the casting up to the end of the ejection stroke.

Figure 2:
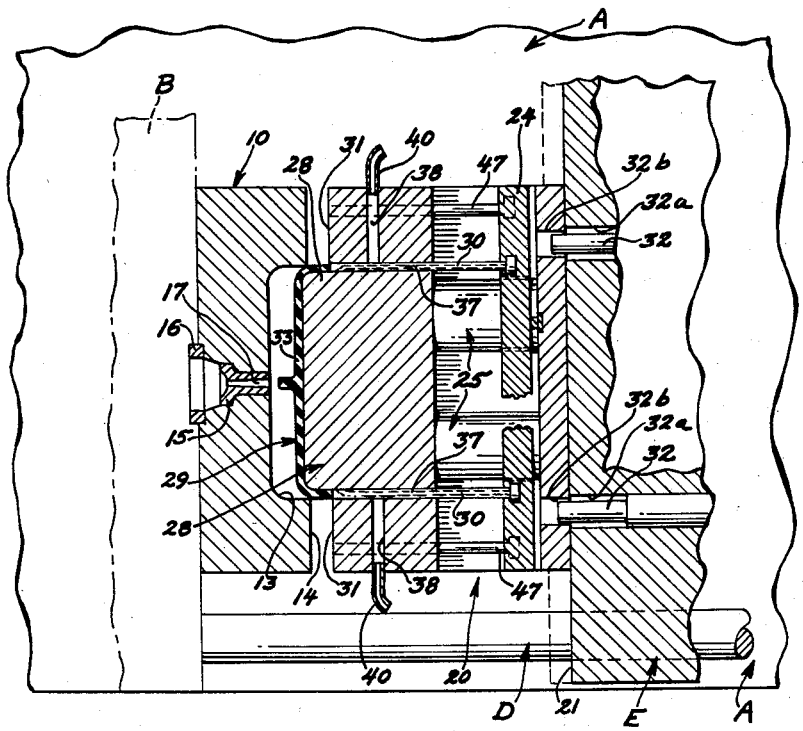
Fig. 2 is a fragmentary sectional view of a portion of the apparatus of Fig. 1 taken on the irregular line 2—2 of Fig. 1 and enlarged over Fig. 1.
Figure 5:
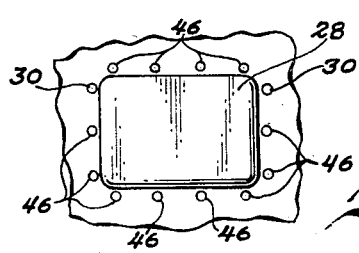
Fig. 5 is a fragmentary view of the male die taken generally on the line 5—5 of Fig. 1.

It will be understood that there may be a large number of ejector pins (as viewed in Fig. 5) spaced generally equally about the periphery of the casting to eliminate any tendency of cocking during ejection of the casting away from the male die, however, it is usually only necessary to provide air passages in one or two such ejector pins, such as is shown in Fig. 2, and preferably above the center line of the dies.

We have found that our casting ejection apparatus makes it possible for the molding machine to be operated unattended and that the castings produced are of uniform quality.

We claim:

For use with a molding apparatus including a stationary support and a die member secured thereto, a movable carrier and a second die member secured thereto, said die members when closed relative to each other defining a cavity shaped to the configuration of an end product to be produced thereby, ejection apparatus for ejecting the end product from the die members upon opening of the die members relative to each other, such apparatus comprising an ejector member movably carried by and movable relative to one of the die members, such ejector member having a passage therein and an angularly branch passage closed by one of said die members when in die closing position, a source of air pressure and air conduction means leading to said passage in said ejector member; means operable for moving said last mentioned die member in die opening direction to cause in sequence the ejector member to engage the end product and jar it loose from the die member and thereafter for said moving die member to open and expose said branch passage to the end product, and additional means for establishing communication between the air conduction means and the ejector member passage whereby to direct a blast of air from said opened branch passage onto the end product after the end product has been jarred loose from the die member by the ejector member.

References Cited in the file of this patent

UNITED STATES PATENTS

| | | |
|---|---|---|
| 2,396,406 | Anderson | Mar. 12, 1946 |
| 2,739,349 | Strauss | Mar. 27, 1956 |
| 2,773,284 | Kelly | Dec. 11, 1956 |